Sept. 16, 1930.  W. A. BRUNO  1,776,177
RHEOSTAT AND POTENTIOMETER
Filed March 22, 1929

WITNESSES
Jos. L. Ramia
A. L. Kitchin

INVENTOR
William A. Bruno
BY
ATTORNEYS

Patented Sept. 16, 1930

1,776,177

UNITED STATES PATENT OFFICE

WILLIAM A. BRUNO, OF NEW YORK, N. Y., ASSIGNOR TO CLAROSTAT MFG. CO. INC., OF BROOKLYN, NEW YORK, A CORPORATION OF NEW YORK

RHEOSTAT AND POTENTIOMETER

Application filed March 22, 1929. Serial No. 349,037.

This invention relates to an improved rheostat and potentiometer, and has for an object to provide a construction wherein the contacting parts may be quickly, easily and accurately varied without a scraping action of the contacting members.

Another object of the invention is to provide a device which may act as a rheostat or as a potentiometer, the structure including a gyratory contact ring with means for causing the ring to function as the control knob is rotated.

A further object, more specifically, is to provide a combined rheostat and poten15 tiometer wherein a desired resistance coacts with a gyrating ring controlled by cams operated by a control knob, so that as the knob is rotated the cams will swing or gyrate the ring to produce a desired shifting of the connections while maintaining a pressure contact rather than a sliding contact.

In the accompanying drawings,—

Figure 1 is a rear view of the construction embodying the invention;

Figure 2 is an edge view of the structure shown in Figure 1;

Figure 1:
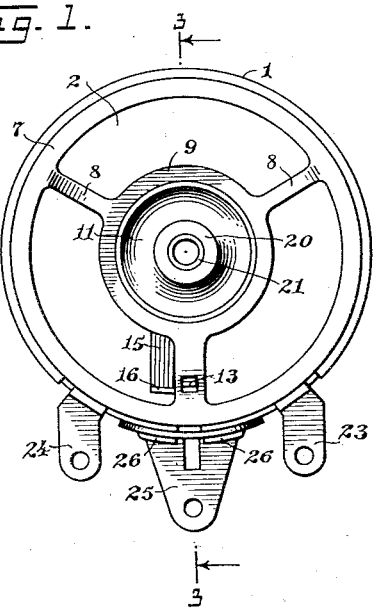
Figure 2:
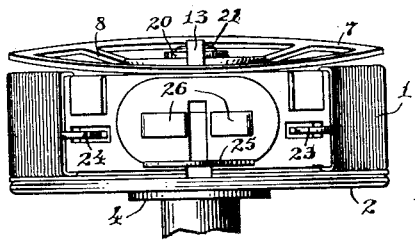
Figure 4:
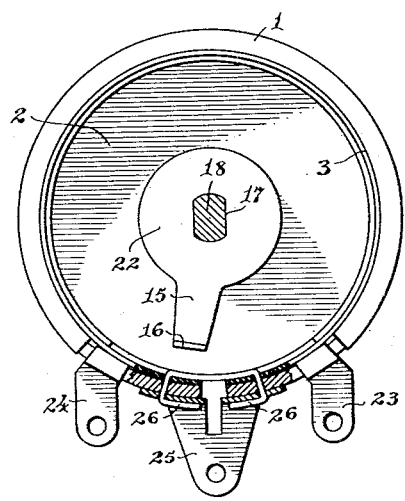
Figure 4 is a sectional view through Fig30 ure 3 approximately on line 4—4.
Figure 3:
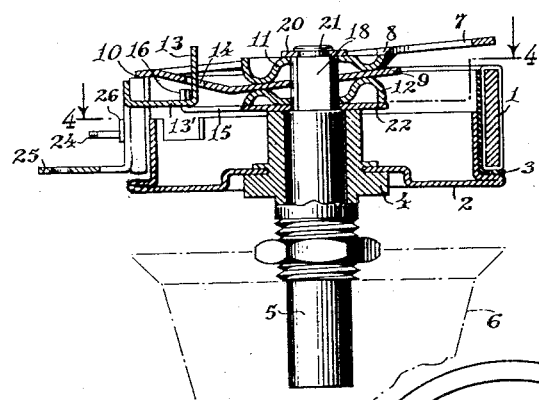
Figure 3 is a sectional view through Figure 1 on the line 3—3.
Figure 6:
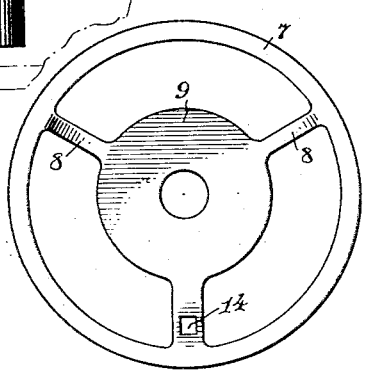
Figure 6 is a plan view of the contact ring shown in Figure 3.
Figure 5:
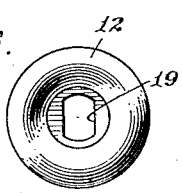
Figure 5 is a plan view of one of the cams shown in Figure 3.

Referring to the accompanying drawings by numerals, 1 indicates a wire wound resistance of a desired kind secured to a suitable supporting casing 2 but insulated therefrom by a suitable insulating member 3. It will be understood that, although a wire wound resistance is shown in the drawing, other forms of resistances may be used and the term "resistance" in the specification is intended to cover these other forms, as for instance, compressed carbon or carbon impregnated paper. The casing 2 is rigidly secured to a tubular member 4 through which the shaft or rod 5 extends. This shaft rotates in order to secure a desired ad50 justment of the various parts and may be manipulated by any desired means, as, for instance, a suitable knob 6. Heretofore in most rheostats and potentiometers a sliding contact was provided and positioned to coact with the resistance 1. Usually this sliding contact was connected with a shaft similar to shaft 5 and caused to move over the resistance to secure the desired adjustment. In the present instance a gyrating ring 7 is provided. This ring is of comparatively stiff metal but is somewhat resilient so as to provide a resilient, tight contact when properly brought into engagement with any part of the resistance 1. As shown in Figure 6, ring 7 is provided with an outer annular portion merging into a plurality of spokes 8 which in turn merge into a central disk or plate 9. Normally the plane of the plate 9 is parallel with the plane of the ring 7 but ring 7 is usually slightly distorted when in use, as shown in Figure 3, whereby an efficient contact with the resistance 1 is secured. As shown in Fig. 3, the ring 7 contacts with the resistance 1 at point 10. By rotating the shaft 5 this contact point will be shifted by a rolling or gyrating action of ring 7. There will be no scraping or sliding movement between ring 7 and resistance 1, but the point of contact of the ring with resistance 1 will be very intimate and firm, so that the current may properly flow in the desired new path. Ring 7 does not rotate but the different points around the ring merely move toward or from resistance 1, as shaft 5 rotates. This is brought about by the cams 11 and 12 acting on plate 9. A stop 13 extends loosely through an aperture 14 in one of the arms 8 so as to prevent any accidental rotary movement of ring 7 and also to provide an abutment for the arm 15, which arm is provided with a stop projection 16 and with a substantially rectangular opening 17 for fitting the shaft 5 at the substantially rectangular section 18. This section is not truly rectangular but is provided with two flat sides and arc-shaped ends, as shown in Figure 4. The cams 11 and 12, as shown in Figure 5, are also formed with openings 19, said openings permitting the cams to snugly fit over section 18.

It will be noted that the plate 9 is provided with a round hole so as to loosely fit over section 18, while the cams 11 and 12 snugly fit over this section and are held in place by a washer 20 which in turn is held in place by having the end 21 upset. It will therefore be seen that the cams 11 and 12, when assembled in the unit opposite to each other, form an inclined opening by virtue of the inclined surfaces, and into this opening rocker 7 is loosely placed so that by rotating the shaft 5 a rocking or gyrating movement of the cams is imparted to member 7. The arm 15 is preferably an integral part of a disk 22 which snugly fits the section 18 so as to rotate therewith and strike the arm 13' from which projection 13 extends. This permits the shaft 5 to have almost a complete revolution and thereby cause the cams to rotate the same distance, in order that the ring 7 shall function throughout the wound portion of the resistance 1. The ends of the resistance 1 are connected to the terminals 23 and 24, while the terminal 25 is grounded on the casing 2 through the use of clamping members 26. When these three terminals are used the device will be functioning as a potentiometer, whereas when only two are used the device will function as a rheostat. Preferably the parts are so formed that by varying the width of portion 15 of stop 22 the ring 7 may or may not be in contact with any part of resistance 1 when the arm 15 or projection 16 is engaging arm 13'. By forming the parts as described and causing the ring 7 to move toward and from the resistance 1 instead of sliding thereover will result in a very efficient contact and will prevent appreciable wearing of the resistance. By providing an arm which slides over the resistor the wearing action is considerable, as the arm must press against the resistor in order to secure the desired contact. This friction or wearing action will soon wear the resistor or resistance until the instrument will be of no appreciable value. By causing the contact ring 7 to move toward and from the resistor the contact is not a sliding one but has the effect merely of pushing an object against the resistor and then pulling the object directly therefrom. This form of contact practically eliminates wear by reason of the absence of any appreciable friction. By the rocking or rolling action of the ring 7 a variable contact with the surface of the resistor is secured. This rolling action, instead of a sliding or rubbing action, obviates any abrasion of the resistor, while at the same time there is secured a proper contact. In this way the resistance between the contact element and the end of the terminals of the resistor may be controllably varied.

It will be understood that the device may be mounted in any desired manner and connected up to the circuit in any desired manner, either as a rheostat or potentiometer.

In the accompanying drawings a certain form of cam has been disclosed, and in fact, opposing cams have been presented having an inclined opening therebetween, whereby the ring 7 may be tilted. It is evident that other specific forms of cams may be used without departing from the spirit of the invention, provided this inclined opening and the action of the cams are maintained. Instead of having cams formed separately from the shaft they could be made an integral part thereof. The two cams are used in order to have a positive up and down movement as the shaft rotates, but if the upper cam is removed a spring could be substituted so that the action, so far as the ring 7 is concerned, will be the same. Where the cam is produced by an inclined annular groove on the shaft the plate surrounding the shaft would have a slot extending from the periphery inwardly in order to properly center the ring 7 and cause the parts to function properly.

What I claim is:—

1. A device of the character described, including a substantially annular resistance, an annular ring coacting therewith, a pair of rotating cams for shifting the ring to produce a rocking action to bring successive portions of the ring into contact with successive portions of the resistance, and a rotatable member for causing said cams to function.

2. A device of the character described, comprising a casing, a resistance carried by said casing, said resistance being substantially annular, a stop carried by the casing, a ring member coacting with said resistance and provided with a central plate and radiating arms, one of said arms having an aperture through which said stop loosely projects, a cam contacting with each side of said central plate, a rotatable shaft rigidly connected with said cams for rotating the cams, whereby the ring member will be given an oscillatory motion and this motion will cause the outer part of the ring member to have successive portions thereof brought into contact with successive portions of said resistance, and an arm connected with said rotatable shaft formed with means positioned to strike said stop, whereby said rotatable shaft can be rotated slightly less than a complete revolution.

3. A device of the character described, including a substantially annular resistance, a ring member having a central plate and a peripheral contact portion adapted to engage said resistance, an annular cam arranged in contact with each face of said plate, said cams being set in opposition so that when they are rotated simultaneously the plate will be rocked to cause said peripheral contact portion to bring successive different portions thereof into contact with successive different portions of said resistance, and a rotatable shaft coacting with said cams for actuating the cams.

4. A device of the character described, including a substantially annular resistance, means acting as terminals to said resistance, an annular member coacting with said resistance, and a pair of oppositely acting cams positioned to rock said annular member when the cams are rotated, said annular member being positioned between and in contact with said cams whereby the annular member will have a rocking action in respect to the resistance for forcing successive different portions into contact with successive different portions of said resistance.

WILLIAM A. BRUNO.